US008547861B2

(12) United States Patent
Yuan et al.

(10) Patent No.: US 8,547,861 B2
(45) Date of Patent: Oct. 1, 2013

(54) OPTIMIZING DOWNLINK COMMUNICATIONS BETWEEN A BASE STATION AND A REMOTE TERMINAL BY POWER SHARING

(75) Inventors: Jun Yuan, Ottawa (CA); Mo-Han Fong, Ottawa (CA)

(73) Assignee: Apple Inc., Cupertino, CA (US)

( * ) Notice: Subject to any disclaimer, the term of this patent is extended or adjusted under 35 U.S.C. 154(b) by 274 days.

(21) Appl. No.: 12/801,977

(22) Filed: Jul. 6, 2010

(65) Prior Publication Data

US 2011/0128871 A1 Jun. 2, 2011

Related U.S. Application Data

(63) Continuation-in-part of application No. 12/589,547, filed on Jul. 6, 2009.

(60) Provisional application No. 61/078,520, filed on Jul. 7, 2008.

(51) Int. Cl.
*G01R 31/08* (2006.01)

(52) U.S. Cl.
USPC .......... 370/252

(58) Field of Classification Search
USPC ......... 370/203, 204–215, 229–240, 310–337, 370/338–350, 395.1, 395.3, 395.4, 395.41, 370/395.42, 395.5, 395.52, 395.53, 412–421, 370/431–457, 458–463, 464–497, 498–522, 370/523–529
See application file for complete search history.

(56) References Cited

U.S. PATENT DOCUMENTS

| | | | | |
|---|---|---|---|---|
| 5,887,261 | A * | 3/1999 | Csapo et al. | 455/450 |
| 7,206,332 | B2 * | 4/2007 | Kwan et al. | 375/140 |
| 7,277,406 | B2 * | 10/2007 | Kim et al. | 370/318 |
| 7,554,937 | B2 * | 6/2009 | Lim et al. | 370/316 |

(Continued)

FOREIGN PATENT DOCUMENTS

| | | |
|---|---|---|
| CA | 2554778 A1 | 9/2005 |
| CA | 2603148 A1 | 10/2006 |

(Continued)

OTHER PUBLICATIONS

International Search Report and Written Opinion of corresponding PCT/CA2010/001045 dated Nov. 15, 2010, 10 pages.

(Continued)

*Primary Examiner* — Jung-Jen Liu
(74) *Attorney, Agent, or Firm* — Meyertons, Hood, Kivlin, Kowert & Goetzel, P.C.

(57) ABSTRACT

A method of optimizing downlink communications between a base station and mobile stations in a wireless communication system involves: identifying users that have a modulation control scheme (MCS) power value greater than a reference power value as high power users; for each of the high power users, calculating a power difference being a difference between a geometry value associated with each of the high power users and a reference geometry value associated with the reference power value respectively; summing the power differences in a power pool; identifying users that have an MCS power value below the reference power value as low power users; associating increased geometry values with at least some of the low power users while depleting the power pool by corresponding amounts until the power pool is depleted; and determining new MCSs for at least some of the low power users based on the increased geometry values.

20 Claims, 21 Drawing Sheets

(56) References Cited

U.S. PATENT DOCUMENTS

| | | | | |
|---|---|---|---|---|
| 7,570,951 | B2 * | 8/2009 | Classon et al. | 455/437 |
| 7,693,032 | B2 * | 4/2010 | Li et al. | 370/204 |
| 7,853,205 | B2 * | 12/2010 | Papasakellariou | 455/23 |
| 8,027,367 | B2 * | 9/2011 | Li et al. | 370/491 |
| 8,054,767 | B2 * | 11/2011 | Choi et al. | 370/280 |
| 8,054,808 | B2 * | 11/2011 | Tayloe et al. | 370/332 |
| 8,064,392 | B2 * | 11/2011 | Chang et al. | 370/329 |
| 8,068,511 | B2 * | 11/2011 | Reznik et al. | 370/447 |
| 8,111,710 | B2 * | 2/2012 | Cheng | 370/437 |
| 8,130,667 | B2 * | 3/2012 | Bertrand et al. | 370/252 |
| 8,140,098 | B2 * | 3/2012 | Gorokhov | 455/501 |
| 8,174,959 | B2 * | 5/2012 | Yang et al. | 370/208 |
| 2004/0081112 | A1 * | 4/2004 | Chen et al. | 370/318 |
| 2004/0198467 | A1 * | 10/2004 | Orlik et al. | 455/574 |
| 2005/0031047 | A1 * | 2/2005 | Maltsev et al. | 375/260 |
| 2007/0082620 | A1 * | 4/2007 | Zhang et al. | 455/69 |
| 2007/0183374 | A1 * | 8/2007 | Classon et al. | 370/338 |
| 2008/0037669 | A1 * | 2/2008 | Pan et al. | 375/260 |
| 2008/0039129 | A1 * | 2/2008 | Li et al. | 455/522 |
| 2008/0080459 | A1 * | 4/2008 | Kotecha et al. | 370/342 |
| 2008/0139207 | A1 * | 6/2008 | Son et al. | 455/437 |
| 2008/0228878 | A1 * | 9/2008 | Wu et al. | 709/205 |
| 2008/0305745 | A1 * | 12/2008 | Zhang et al. | 455/67.11 |
| 2009/0060081 | A1 * | 3/2009 | Zhang et al. | 375/267 |
| 2009/0161591 | A1 * | 6/2009 | Ahmadi et al. | 370/312 |
| 2009/0219856 | A1 * | 9/2009 | Richardson et al. | 370/328 |
| 2009/0285169 | A1 * | 11/2009 | Yang et al. | 370/329 |
| 2011/0003606 | A1 * | 1/2011 | Forenza et al. | 455/501 |
| 2011/0032813 | A1 * | 2/2011 | Tian et al. | 370/203 |
| 2011/0044193 | A1 * | 2/2011 | Forenza et al. | 370/252 |
| 2011/0130165 | A1 * | 6/2011 | Yuan et al. | 455/522 |
| 2012/0093078 | A1 * | 4/2012 | Perlman et al. | 370/328 |

FOREIGN PATENT DOCUMENTS

| | | | |
|---|---|---|---|
| EP | 0415810 | A1 | 3/1991 |
| EP | 2061173 | A1 | 5/2009 |
| WO | 94/11957 | A1 | 5/1994 |
| WO | 03/084092 | A2 | 10/2003 |
| WO | 2007/053954 | A1 | 5/2007 |
| WO | 2008/021062 | A1 | 2/2008 |
| WO | 2008/075843 | A1 | 6/2008 |
| WO | 2009/002097 | A1 | 12/2008 |

OTHER PUBLICATIONS

Office Action for corresponding U.S. Appl. No. 12/589,547, Oct. 7, 2011, 9 pages.

Office Action for related U.S. Appl. No. 12/806,185, Jan. 9, 2012, 7 pages.

International Search Report and Written Opinion of corresponding PCT/CA2010/001530 dated Feb. 2, 2011, 12 pages.

International Search Report and Written Opinion of corresponding PCT/CA2010/001046 dated Dec. 30, 2010, 9 pages.

International Search Report and Written Opinion of corresponding PCT/CA2010/001529 dated Jan. 27, 2011, 12 pages.

International Search Report and Written Opinion of corresponding PCT/CA2010/001042 dated Sep. 17, 2010, 9 pages.

Office Action (including Notice of References Cited) from corresponding U.S. Appl. No. 12/806,184 issued on Apr. 21, 2011, 9 pages.

IEEE 802.16—2004.

Draft IEEE 802.16m System Description Document, IEEE 802.16m-08/003r1, dated Apr. 15, 2008.

IEEE 802.16e—2005.

IEEE802.16—2009.

Hunziker et al.; "Feedback-Aided Selective Subspace Retransmission for Outage-Free Spatial Multiplexing"; Information, Communications & Signal Processing; 2007 6th International Conference Feb. 12, 2008.

Islam et al.; "Space-Time Block Coding in MIMO Cognitive Networks with Known Channel Correlations"; Wireless Technology, 2008; EuWiT 2008 European Conference Jan. 19, 2009.

PCT/CA2010/001046 "International Search Report" dated Dec. 30, 2010, 3 pages.

PCT/CA2010/001046 "Written Opinion" dated Dec. 30, 2010, 6 pages.

Mohammad Ali Maddah-Ali et al.; "Communication Over MIMO X Channels: Interference Alignment, Decomposition, and Performance Analysis"; IEEE Transactions on Information Theory, vol. 54, No. 8, Aug. 2008, 3457-3470.

Charan Langton; Intuitive Guide to Principles of Communications: Orthogonal Frequency Division Multiplex (OFDM) Tutorial; www.complextoreal.com; 2004.

3GPP TSG-RAN Working Group 1 Meeting 54b, Prague, Czech Republic, Sep. 29-Oct. 3, 2008.

Wikipedia "Orthogonal frequency-division multiple access" Jun. 21, 2010.

Wikipedia "Orthogonal frequency-division multiplexing" Jun. 22, 2010.

* cited by examiner

214

Input

| User ID | Geometry |
|---|---|
| 1 | 10 |
| 2 | 7.2 |
| 3 | 4.3 |
| 4 | 1.5 |
| 5 | 2.8 |
| 6 | 8.7 |
| 7 | 4.7 |
| 8 | 6.8 |

Reference Table 220 222 224

| Geometry Range | MCS Power Value | MCS |
|---|---|---|
| 0-1.9 | 1 | QPSK 1/16 |
| 2-3.4 | 2 | QPSK 1/12 |
| 3.5-5.1 | 3 | QPSK 1/8 |
| 5.2-6.4 | 4 | QPSK 1/4 |
| 6.5-~ | 5 | QPSK 1/2 |

FIG. 16

Assign MCS Power Values:

| User ID | Geometry | MCS Power Value |
|---|---|---|
| 1 | 10 | 5 |
| 2 | 7.2 | 5 |
| 3 | 4.3 | 3 |
| 4 | 1.5 | 1 |
| 5 | 2.8 | 2 |
| 6 | 8.7 | 5 |
| 7 | 4.7 | 3 |
| 8 | 6.8 | 5 |

Sorted by Geometry:

| User ID | Geometry | MCS Power Value |
|---|---|---|
| 1 | 10 | 5 |
| 6 | 8.7 | 5 |
| 2 | 7.2 | 5 |
| 8 | 6.8 | 5 |
| 7 | 4.7 | 3 |
| 3 | 4.3 | 3 |
| 5 | 2.8 | 2 |
| 4 | 1.5 | 1 |

FIG. 18

Excess Power above Reference MCS:

234 236

| | User ID | MCS Power Values | Geometry | Reference Geometry | Power difference (Additions to Power Pool) |
|---|---|---|---|---|---|
| 1d | 1 | 5 | 10 | 5.2 | 10-5.2=4.8 |
| 1d | 6 | 5 | 8.7 | 5.2 | 8.7-5.2=3.5 |
| 1d | 2 | 5 | 7.2 | 5.2 | 7.2-5.2=2.0 |
| 1d | 8 | 5 | 6.8 | 5.2 | 6.8-5.2=1.6 |
| 1g | 7 | 3 | 4.7 | | 11.9 |
| 1g | 3 | 3 | 4.3 | | |
| 1g | 5 | 2 | 2.8 | | |
| 1g | 4 | 1 | 1.5 | | |

Power increases from Power Pool:

| User ID | MCS Power Values | Geometry | Subtractions from power pool | Reference Geometry |
|---|---|---|---|---|
| 1 | 5 | 10 | | 5.2 |
| 6 | 5 | 8.7 | | 5.2 |
| 2 | 5 | 7.2 | | 5.2 |
| 8 | 5 | 6.8 | | 5.2 |
| 7 | 3 | 4.7 | 5.2-4.7=0.5 | 5.2 |
| 3 | 3 | 4.3 | 5.2-4.3=0.9 | 5.2 |
| 5 | 2 | 2.8 | 5.2-2.8=2.4 | 5.2 |
| 4 | 1 | 1.5 | 5.2-1.5=3.7 | 5.2 |
| | | | 7.5 | |

FIG. 20

Target Geometries

| User ID | Geometry | MCS Power Values | Target Geometry |
|---|---|---|---|
| 1 | 10 | 4 | 5.2 |
| 6 | 8.7 | 4 | 5.2 |
| 2 | 7.2 | 4 | 5.2 |
| 8 | 6.8 | 4 | 5.2 |
| 7 | 4.7 | 4 | 5.2 |
| 3 | 4.3 | 4 | 5.2 |
| 5 | 2.8 | 4 | 5.2 |
| 4 | 1.5 | 4 | 5.2 |

FIG. 21

Target MCS

| User ID | Geometry | MCS Power Values | Target Geometry | New MCS |
|---|---|---|---|---|
| 1 | 10 | 4 | 5.2 | QPSK 1/4 |
| 6 | 8.7 | 4 | 5.2 | QPSK 1/4 |
| 2 | 7.2 | 4 | 5.2 | QPSK 1/4 |
| 8 | 6.8 | 4 | 5.2 | QPSK 1/4 |
| 7 | 4.7 | 4 | 5.2 | QPSK 1/4 |
| 3 | 4.3 | 4 | 5.2 | QPSK 1/4 |
| 5 | 2.8 | 4 | 5.2 | QPSK 1/4 |
| 4 | 1.5 | 4 | 5.2 | QPSK 1/4 |

FIG. 22

Output Data

| User ID | New MCS | MCS Power Values |
|---|---|---|
| 1 | QPSK 1/4 | 4 |
| 2 | QPSK 1/4 | 4 |
| 3 | QPSK 1/4 | 4 |
| 4 | QPSK 1/4 | 4 |
| 5 | QPSK 1/4 | 4 |
| 6 | QPSK 1/4 | 4 |
| 7 | QPSK 1/4 | 4 |
| 8 | QPSK 1/4 | 4 |

FIG. 23

Excess Power above Reference MCS power value
Reference Geometry value = low end of range associated with Highest MCS

| User ID | MCS Power Values | Geometry | Reference Geometry | Power difference (Additions to Power Pool) |
|---|---|---|---|---|
| 1 | 5 | 10 | 6.5 | 10-6.5=3.5 |
| 6 | 5 | 8.7 | 6.5 | 8.7-6.5=2.2 |
| 2 | 5 | 7.2 | 6.5 | 7.2-6.5=0.7 |
| 8 | 5 | 6.8 | 6.5 | 6.8-6.5=0.3 |
| 7 | 3 | 4.7 | | 6.7 |
| 3 | 3 | 4.3 | | |
| 5 | 2 | 2.8 | | |
| 4 | 1 | 1.5 | | |

Power increases from Power Pool

| User ID | MCS Power Values | Geometry | Subtractions from power pool | Target Geometry |
|---|---|---|---|---|
| 1 | 5 | 10 | | |
| 6 | 5 | 8.7 | | |
| 2 | 5 | 7.2 | | |
| 8 | 5 | 6.8 | | |
| 7 | 3 | 4.7 | | |
| 3 | 3 | 4.3 | | |
| 5 | 2 | 2.8 | 1.7 (left over) | 4.5 |
| 4 | 1 | 1.5 | 6.5-1.5=5.0 | 6.5 |
| | | | 6.7 | |

FIG. 26

Target Geometries

| User ID | Geometry | MCS Power Values | Target Geometry |
|---|---|---|---|
| 1 | 10 | 5 | 6.5 |
| 6 | 8.7 | 5 | 6.5 |
| 2 | 7.2 | 5 | 6.5 |
| 8 | 6.8 | 5 | 6.5 |
| 7 | 4.7 | 3 | 4.7 |
| 3 | 4.3 | 3 | 4.7 |
| 5 | 2.8 | 2 | 4.5 |
| 4 | 1.5 | 1 | 6.5 |

FIG. 27

Target MCS

| User ID | Geometry | MCS Power Values | Target Geometry | New MCS Power Values | New MCS |
|---|---|---|---|---|---|
| 1 | 10 | 5 | 6.5 | 5 | QPSK 1/2 |
| 6 | 8.7 | 5 | 6.5 | 5 | QPSK 1/2 |
| 2 | 7.2 | 5 | 6.5 | 5 | QPSK 1/2 |
| 8 | 6.8 | 5 | 6.5 | 5 | QPSK 1/2 |
| 7 | 4.7 | 3 | 4.7 | 3 | QPSK 1/12 |
| 3 | 4.3 | 3 | 4.7 | 3 | QPSK 1/12 |
| 5 | 2.8 | 2 | 4.5 | 3 | QPSK 1/8 |
| 4 | 1.5 | 5 | 6.5 | 5 | QPSK 1/2 |

FIG. 28

Output Data

| User ID | Target MCS | New MCS Power Values |
|---|---|---|
| 1 | QPSK 1/2 | 5 |
| 2 | QPSK 1/2 | 5 |
| 3 | QPSK 1/12 | 5 |
| 4 | QPSK 1/2 | 5 |
| 5 | QPSK 1/8 | 3 |
| 6 | QPSK 1/2 | 3 |
| 7 | QPSK 1/12 | 3 |
| 8 | QPSK 1/2 | 5 |

FIG. 29

OPTIMIZING DOWNLINK COMMUNICATIONS BETWEEN A BASE STATION AND A REMOTE TERMINAL BY POWER SHARING

CROSS-REFERENCE TO RELATED APPLICATIONS

This application is a continuation-in-part of non-provisional application Ser. No. 12/589,547 filed Jul. 6, 2009 resulting from conversion under 37 C.F.R. §1.53(c)(3) of U.S. provisional patent application No. 61/223,148 filed on Jul. 6, 2009, and which claims the benefit of U.S. provisional patent application No. 61/078,520 filed on Jul. 7, 2008. U.S. patent application Ser. No. 12/589,547 (converted from U.S. provisional patent application No. 61/223,148) is hereby incorporated by reference in its entirety.

BACKGROUND OF THE INVENTION

1. Field of Invention

This application relates to optimizing downlink communications between a base station and a remote terminal by power sharing in a wireless communication system, and more particularly to base station controlled power sharing for downlink communications optimization.

2. Description of Related Art

Draft IEEE 802.16m System Description Document, IEEE 802.16m-08/003r1, dated Apr. 15, 2008, was intended to amend the IEEE 802.16 WirelessMAN-OFDMA specification to provide an advanced air interface for operation in licensed bands. The draft was intended to describe provisions that meet the cellular layer requirements of IMT-Advanced next generation mobile networks and provide continuing support for legacy WirelessMAN-OFDMA equipment. In addition, the purpose of the draft was to provide performance improvements necessary to support future advanced services and applications, such as those described by the ITU in Report ITU-R M.2072.

The proposal provided in the draft however, leaves many things to be desired. For example, one objective in accordance with the standard may be to minimize total power resource units subject to total power control per base station and minimum signal to noise requirements for scheduled users. Meeting this objective presents a nonlinear optimization problem, which is difficult to solve. In particular two main issues arise: feasibility and optimality. In other words the optimal power plan must be feasible.

SUMMARY OF THE INVENTION

In accordance with one aspect of the invention there is provided a method of optimizing downlink for communications between a base station and mobile stations in a wireless communication system. The method involves acquiring user identifiers and geometry values for the mobile stations that are associated with registered users of the system. The method also involves associating modulation control scheme (MCS) power values with respective users in response to respective geometry values, initializing a power pool, identifying users that have an MCS power value greater than a reference MCS power value as high power users and calculating a power difference for each of the high power users. The power difference is a difference between the geometry value associated with each of the high power users and a reference geometry value associated with the reference MCS power value respectively. The method further involves accumulating in the power pool, the power differences associated with respective high power users, by summing the power differences. The method further involves identifying users that have an MCS power value below the reference MCS power value as low power users, associating increased geometry values with at least some of the low power users while depleting the power pool by corresponding amounts until the power pool is depleted, determining new MCSs for at least some of the low power users based on the increased geometry values and causing control information to be transmitted to the low power users using modulation and control schemes identified by corresponding new MCSs at power levels associated with the new MCSs.

The geometry values may include signal to noise ratio values.

The signal to noise ratio may be represented by signal to noise values received from mobile stations.

Associating MCS power values may involve assigning MCS power values according to ranges in which the geometry values reside.

The method may further involve sorting user identifiers in order of increasing or decreasing geometry values.

Associating the increased geometry values to at least some of the low power users may involve associating the reference geometry value to the low power users in order of increasing geometry.

The reference MCS power value may be a highest MCS power value required for downlink control.

Causing control information to be transmitted to the low power users wherein to be transmitted may involve causing a control system of the base station to produce a frame involving a control patch for transmission to the registered users using the new MCSs and power levels associated therewith.

The method may further involve assigning a reference MCS corresponding to the reference MCS power value to the high power users and causing communications with the high power users to be conducted using the reference MCS.

In accordance with another aspect of the invention, there is provided a computer-readable medium encoded with codes for directing a processor circuit to carry out any of the methods described above.

In accordance with another aspect of the invention there is provided an apparatus for optimizing downlink communications between a base station and mobile stations in a wireless communication system. The apparatus includes an input for receiving user identifiers and geometry values for mobile stations that are associated with registered users of the system. The apparatus also includes a processor circuit in communication with the input, the processor circuit being operably configured to associate modulation control scheme (MCS) power values with respective users in response to respective geometry values, initialize a power pool, identify users that have an MCS power value greater than a reference MCS power value as high power users, and calculate a power difference for each of the high power users. The power difference is a difference between the geometry value associated with each of the high power users and a reference geometry value associated with the reference MCS respectively. The processor circuit is also operably configured to accumulate in the power pool, the power differences associated with respective high power users, by summing the power differences, and to identify users that have an MCS power value below the reference MCS power value as low power users, and to associate increased geometry values with at least some of the low power users while depleting the power pool by corresponding amounts until the power pool is depleted. The processor circuit is also operably configured to determine new MCSs for at least some of the low power users based on the increased geometry values. The apparatus further includes an output in communication with the processor circuit for providing signals for causing control information to be transmitted to the low power users using modulation and control schemes identified by corresponding new MCSs at power levels associated with the new MCSs.

The geometry values may include signal to noise ratio values.

The signal to noise ratio may be represented by signal to noise ratio values received from mobile stations.

The processor circuit may be operably configured to associate MCS power values with users according to ranges in which the geometry values reside.

The processor circuit may be operably configured to sort user identifiers in order of increasing or decreasing geometry values.

Associating increased geometry values to at least some of the low power users may include associating the reference geometry value to the low power users in order of increasing geometry.

The reference MCS power value may be a highest MCS power value required for downlink control.

The processor circuit may be operably configured to produce signals representing a frame including a control patch for transmission to the registered users according to the new MCSs at power levels associated with the new MCSs.

The processor circuit may be operably configured to assign a reference MCS corresponding to the reference MCS power value to the high power users and to cause the control patch to be transmitted to the high power users using the reference MCS and associated power level.

The apparatus may further include a base station in a wireless communication system.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present application will now be described, by way of example only, with reference to the accompanying drawing figures, wherein:

FIG. 15 is a tabular representation of data input to the process shown in FIG. 14.

FIG. 16 is a reference table used by the processor in executing the process shown in FIG. 14.

FIG. 17 is a tabular representation of modular control scheme (MCS) power values assigned to the input shown in FIG. 14 in accordance with the reference table shown in FIG. 16.

FIG. 18 is the table of FIG. 17 shown sorted in descending order.

FIG. 19 is a tabular representation of determining power differences and accumulating said differences in a power pool.

FIG. 20 is a tabular representation of reallocating power from the power pool to low-power users.

FIG. 21 is a tabular representation of associating new MCS power values according to the new geometry shown in FIG. 20.

FIG. 22 is a tabular representation of an assignment of target modulation control schemes according to new geometry shown in FIG. 20.

FIG. 23 is a tabular representation of data produced by the process shown in FIG. 14.

FIG. 25 is a tabular representation of a calculation of power differences and accumulating such power differences in the power pool, according to a second embodiment of the invention.

FIG. 26 is a tabular representation of assigning power from the power pool to low-power users to increase the geometry of low-power users, according to the second embodiment.

FIG. 27 is a tabular representation of new target geometry values associated with respective users, according to the second embodiment.

FIG. 28 is a tabular representation of associating new MCS power values with the new geometry values of FIG. 27 and associating target modulation control schemes according to the new MCS power values.

FIG. 29 is a tabular representation of output data produced by executing the process of FIG. 14 in accordance with the second embodiment of the invention, the output data shown in FIG. 29 being included within the OFDMA frame shown in FIG. 24 in accordance with the second embodiment of the invention for communicating new modulation control schemes that optimize power usage to the mobile stations.

Like reference numerals are used in different figures to denote similar elements.

DETAILED DESCRIPTION

Wireless System Overview

Figure 1:
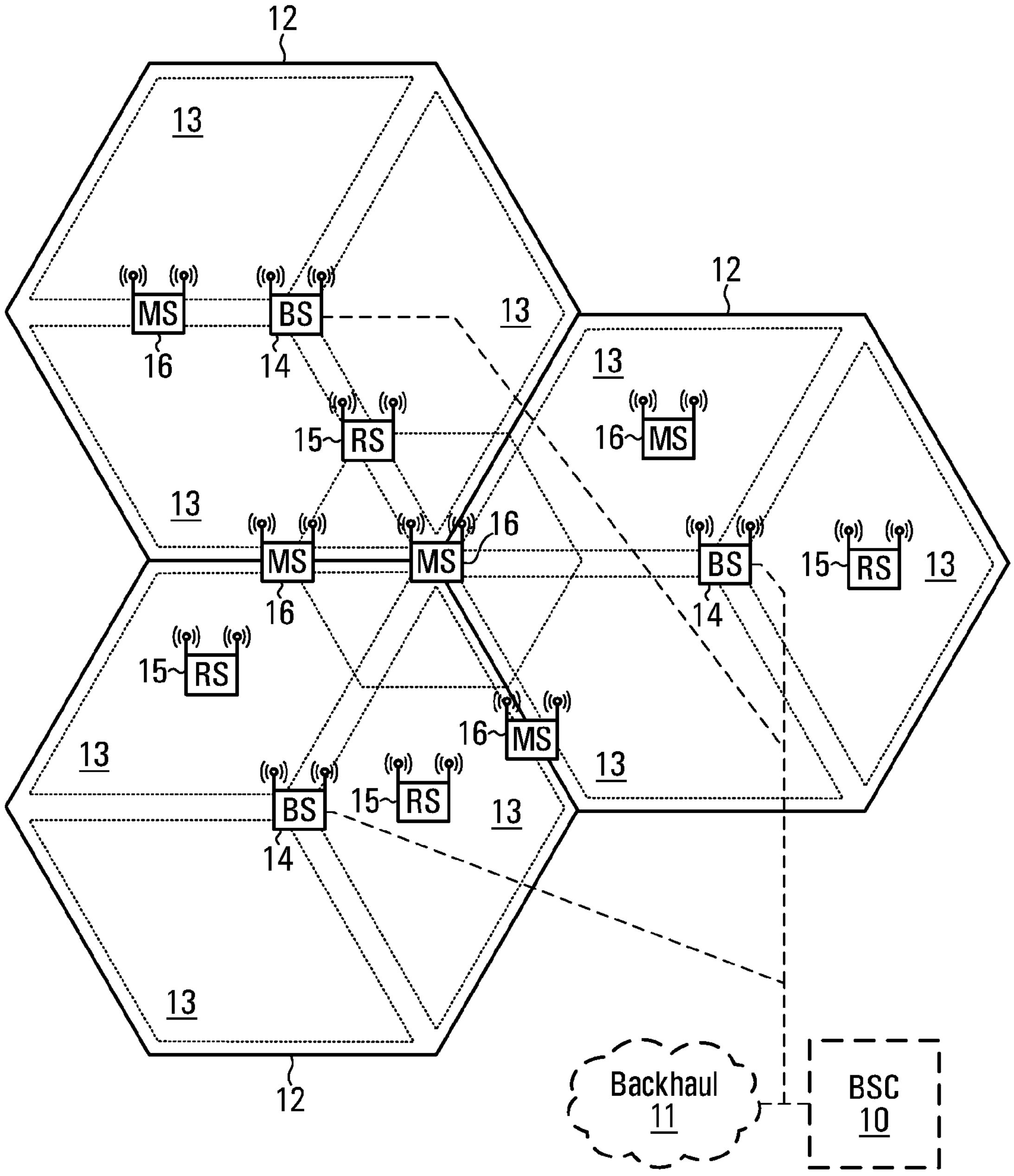
FIG. 1 is a block diagram of a generic cellular communication system in which aspects of the present invention may be implemented.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using Orthogonal Frequency-Division Multiplexing (OFDM) digital modulation scheme with mobile stations (MS) and/or wireless terminals 16, which are within the cell 12 associated with the corresponding base station 14.

Movement of the mobile stations 16 in relation to the base stations 14 results in significant fluctuation in channel conditions. As illustrated, the base stations 14 and the mobile stations 16 may include multiple antennas to provide spatial diversity for communications. In some configurations, relay stations 15 may assist in communications between the base stations 14 and the mobile stations 16. The mobile stations 16 can be handed off from any of the cells 12, the sectors 13, the zones (not shown), the base stations 14 or the relay stations 15 to another one of the cells 12, the sectors 13, the zones (not shown), the base stations 14 or the relay stations 15. In some configurations, the base stations 14 communicate with each other and with another network (such as a core network or the internet, both not shown) over a backhaul network 11. In some configurations, the base station controller 10 is not needed.

Base Station

Figure 2:
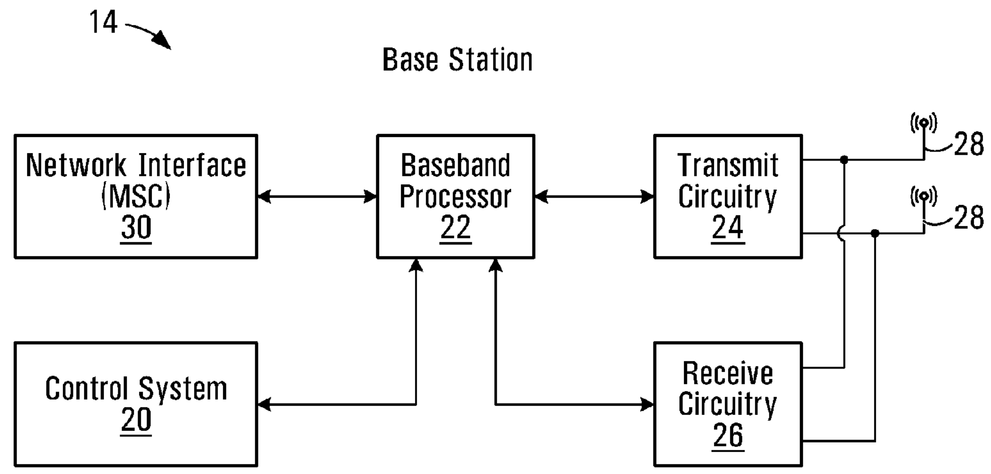
FIG. 2 is a block diagram of a base station depicted in FIG. 1.

With reference to FIG. 2, an example of a base station 14 is illustrated. The base station 14 generally include a control system 20, a baseband processor 22, transmit circuitry 24, receive circuitry 26, multiple transmit antennas 28, and a network interface 30. The receive circuitry 26 receives radio frequency signals bearing information from one or more remote transmitters provided by the mobile stations 16 (illustrated in FIG. 3) and the relay stations 15 (illustrated in FIG. 4). A low noise amplifier and a filter (not shown) may cooperate to amplify and remove broadband interference from the received signal for processing. Downconversion and digitization circuitry (not shown) will then downconvert the filtered, received signal to an intermediate or baseband frequency signal, which is then digitized into one or more digital streams.

The baseband processor 22 processes the digitized streams to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The information is then sent across a wireless network via the network interface 30 or transmitted to another one of the mobile stations 16 serviced by the base station 14, either directly or with the assistance of one of the relay stations 15.

To perform transmitting functions, the baseband processor 22 receives digitized data, which may represent voice, data, or control information, from the network interface 30 under the control of the control system 20, and produces encoded data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the transmit antennas 28 through a matching network (not shown). Modulation and processing details are described in greater detail below.

Mobile Station

Figure 3:
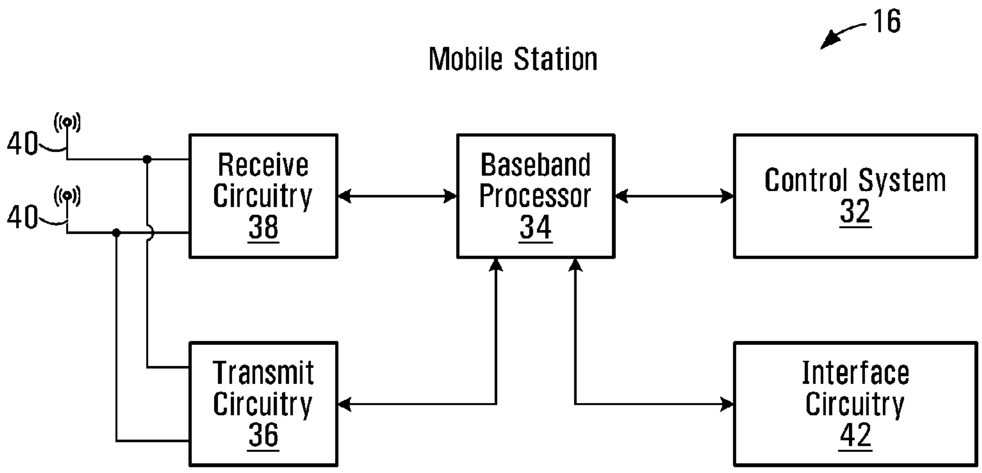
FIG. 3 is a block diagram of a wireless terminal depicted in FIG. 1.

With reference to FIG. 3, an example of a mobile station 16 is illustrated. Similarly to the base stations 14, the mobile station 16 includes a control system 32, a baseband processor 34, transmit circuitry 36, receive circuitry 38, multiple receive antennas 40, and user interface circuitry 42. The receive circuitry 38 receives radio frequency signals bearing information from one or more of the base stations 14 and the relay stations 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized streams to extract information or data bits conveyed in the signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals at a desired transmit frequency or frequencies. A power amplifier (not shown) amplifies the modulated carrier signals to a level appropriate for transmission, and delivers the modulated carrier signal to the receive antennas 40 through a matching network (not shown). Various modulation and processing techniques available to those skilled in the art may be used for signal transmission between the mobile stations 16 and the base stations 14, either directly or via the relay stations 15.

OFDM Modulation

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation includes the use of an Inverse Fast Fourier Transform (IFFT) on the information to be transmitted. For demodulation, a Fast Fourier Transform (FFT) is performed on the received signal to recover the transmitted information. In practice, the IFFT and FFT are provided by digital signal processing involving an Inverse Discrete Fourier Transform (IDFT) and Discrete Fourier Transform (DFT), respectively. Accordingly, a characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile stations 16. Each of the base stations 14 is equipped with "n" of the transmit antennas 28 (n>=l), and each of the mobile stations 16 is equipped with "m" of the receive antennas 40 (m>=1). Notably, the respective antennas can be used for reception and transmission using appropriate duplexers or switches and are so labelled only for clarity.

When the relay stations 15 are used, OFDM is preferably used for downlink transmission from the base stations 14 to the relay stations and from the relay stations to the mobile stations 16.

Relay Station

Figure 4:
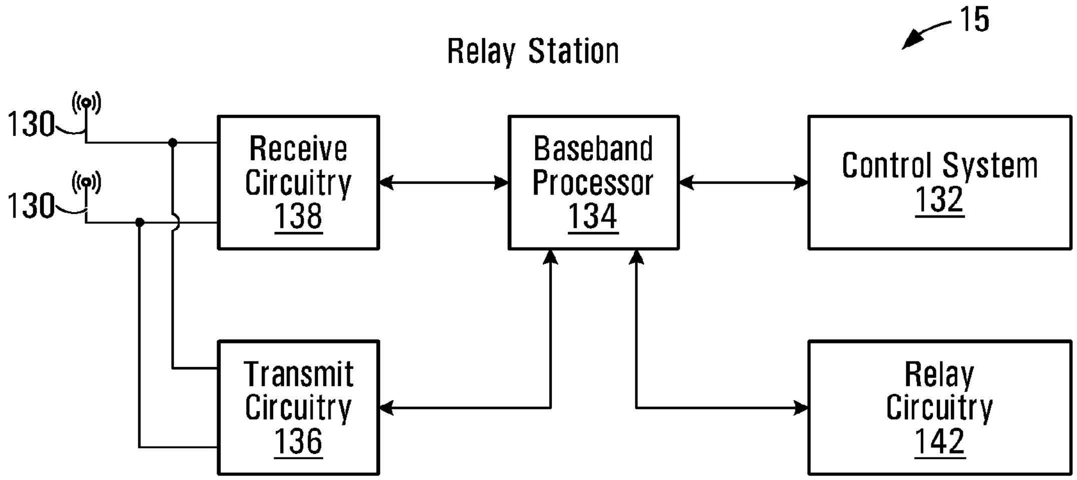
FIG. 4 is a block diagram of an example relay station depicted in FIG. 1.

With reference to FIG. 4, an exemplary relay station 15 is illustrated. Similarly to the base stations 14, and the mobile stations 16, the relay station 15 includes a control system 132, a baseband processor 134, transmit circuitry 136, receive circuitry 138, multiple antennas 130, and relay circuitry 142. The relay circuitry 142 enables the relay station 15 to assist in communications between one of the base stations 14 and one of the mobile stations 16. The receive circuitry 138 receives radio frequency signals bearing information from one or more of the base stations 14 and the mobile stations 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digital streams to extract information or data bits conveyed in the signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art may be used for signal transmission between the mobile stations 16 and the base stations 14, either directly or indirectly via the relay stations 15, as described above.

Figure 5:
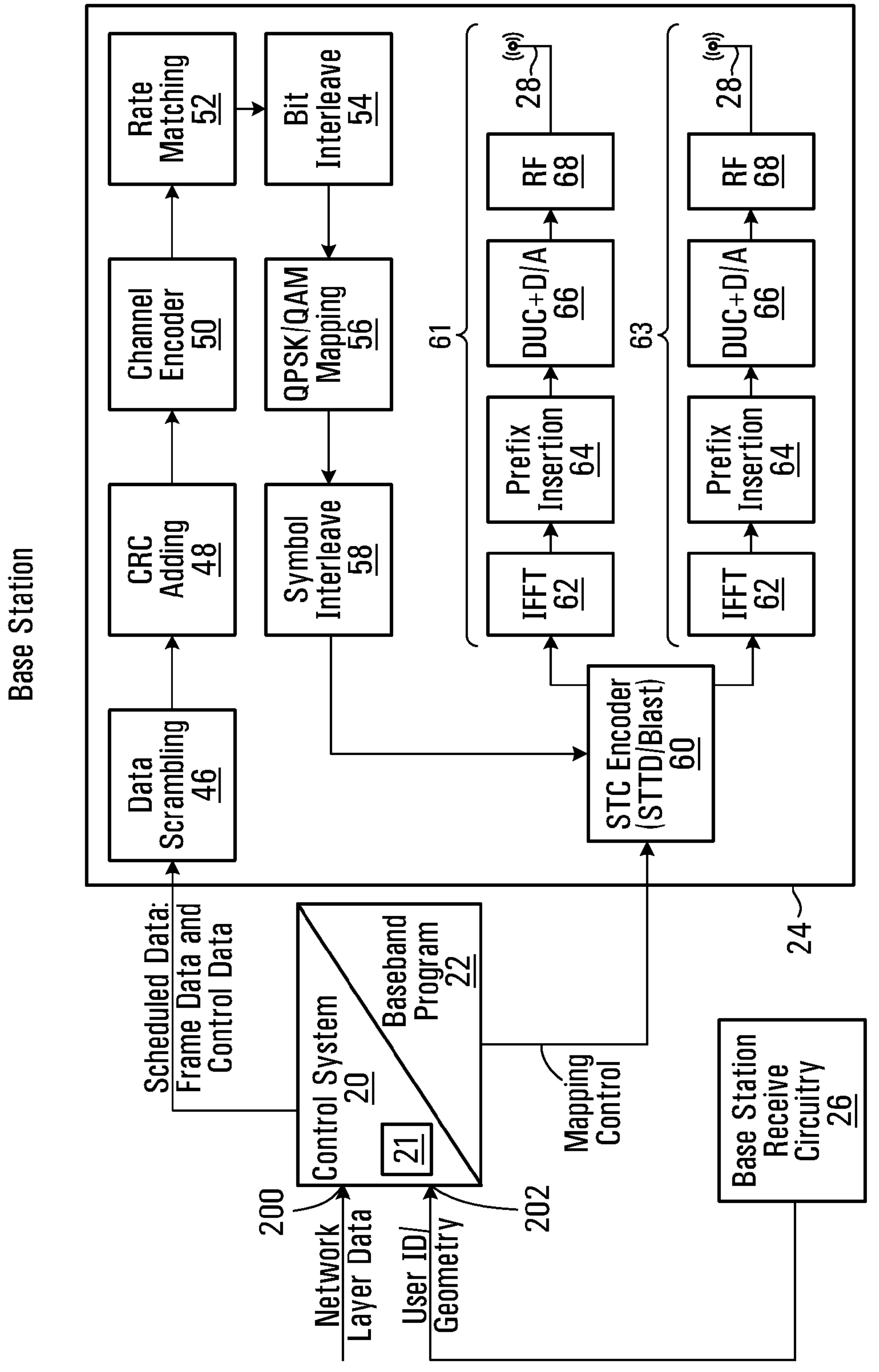
FIG. 5 is a block diagram of a logical breakdown of an example OFDM transmitter of the base station shown in FIG. 2.

With reference to FIG. 5, a logical OFDM transmission architecture will be described. Referring to FIG. 1, initially, the base station controller 10 will send data to be transmitted to various ones of the mobile stations 16 to the base stations 14, either directly or with the assistance of one of the relay stations 15. The base stations 14 may use channel quality indicators (CQIs) associated with the mobile stations 16 to schedule the data for transmission and to select appropriate coding and modulation for transmitting the scheduled data. For example, in accordance with one embodiment of the invention, knowledge of scheduled users and their geometry or signal to noise ratio (SNR) is used to assign a Modulation and Coding Scheme (MCS) for a given OFDM frame. The CQIs may be provided directly by the mobile stations 16 or may be determined by the base stations 14 based on information provided by the mobile stations. In either case, the CQI for each of the mobile stations 16 is a function of the degree to which the channel amplitude (or response) varies across the OFDM frequency band. The CQI may include a geometry value such as a signal to noise ratio, for example, representing the signal to noise ratio of the signal received at one of the mobile stations 16.

Figure 10:
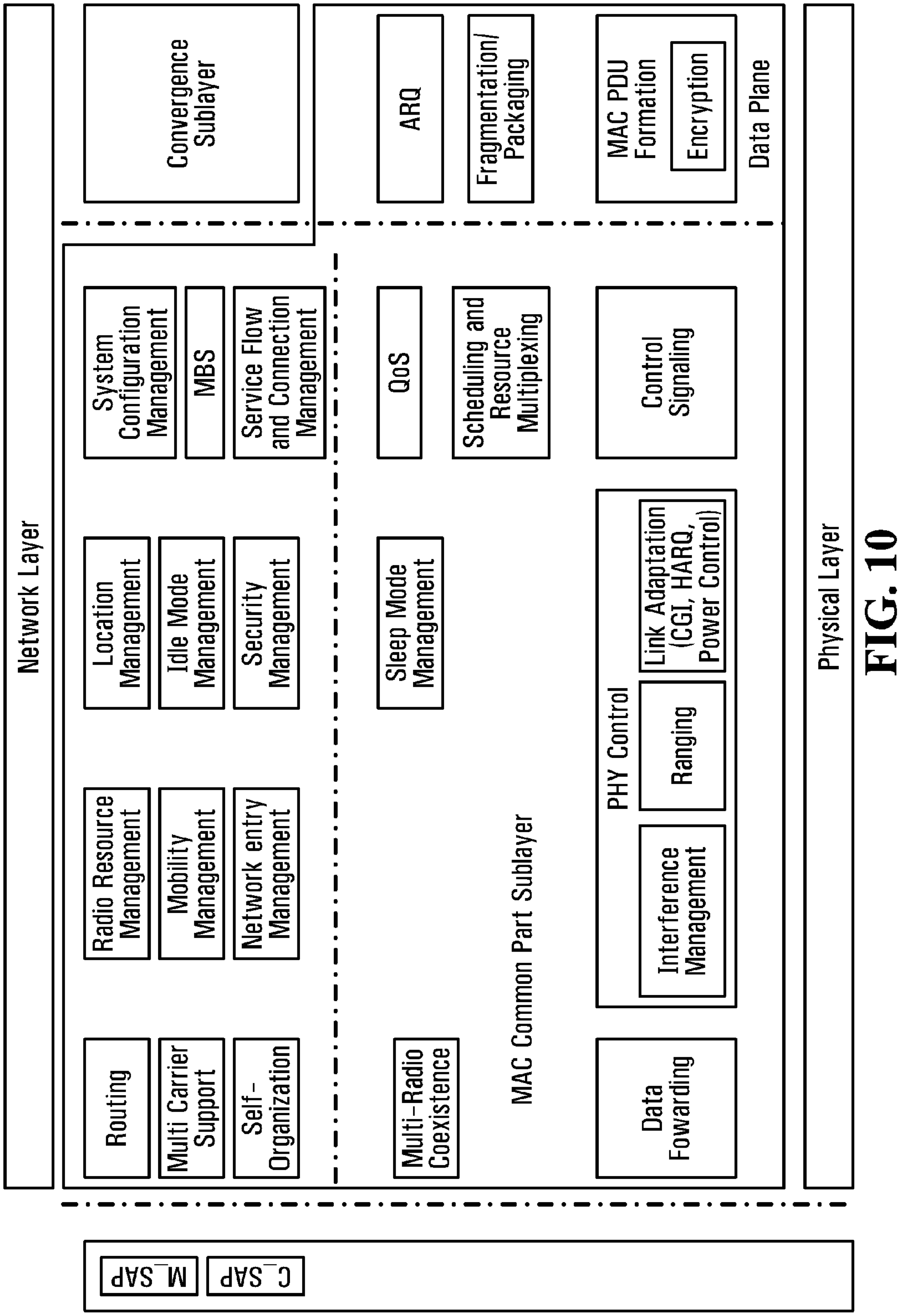
FIG. 10 is a schematic representation of a Protocol Structure in accordance with IEEE 802.16m and corresponds to FIG. 4 of IEEE 802.16m-08/003r1.
Figure 11:
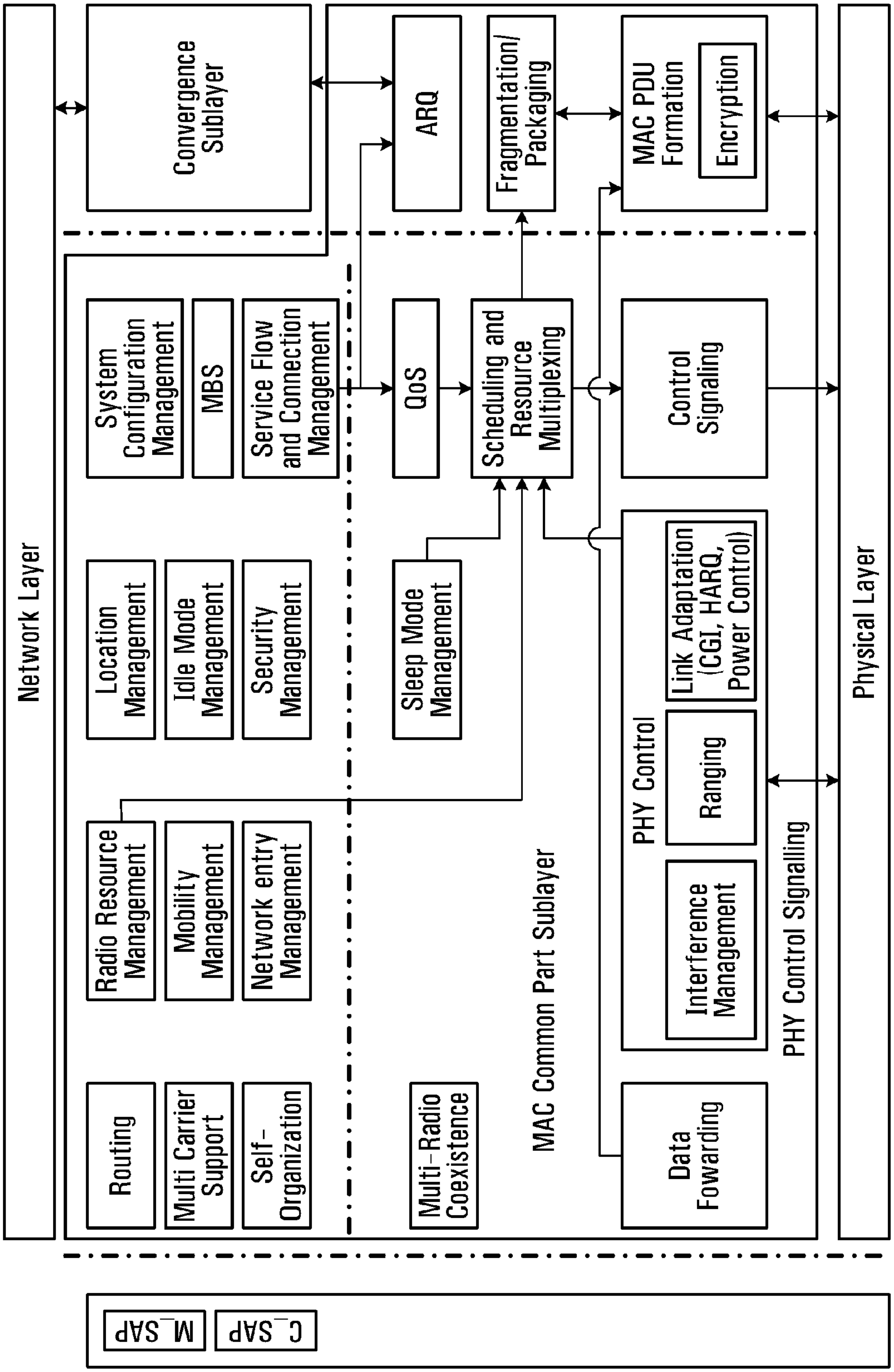
FIG. 11 is a Processing Flow diagram of a MS/BS Data Plane in accordance with IEEE 802.16m and corresponds to FIG. 5 of IEEE 802.16m-08/003r1.
Figure 12:
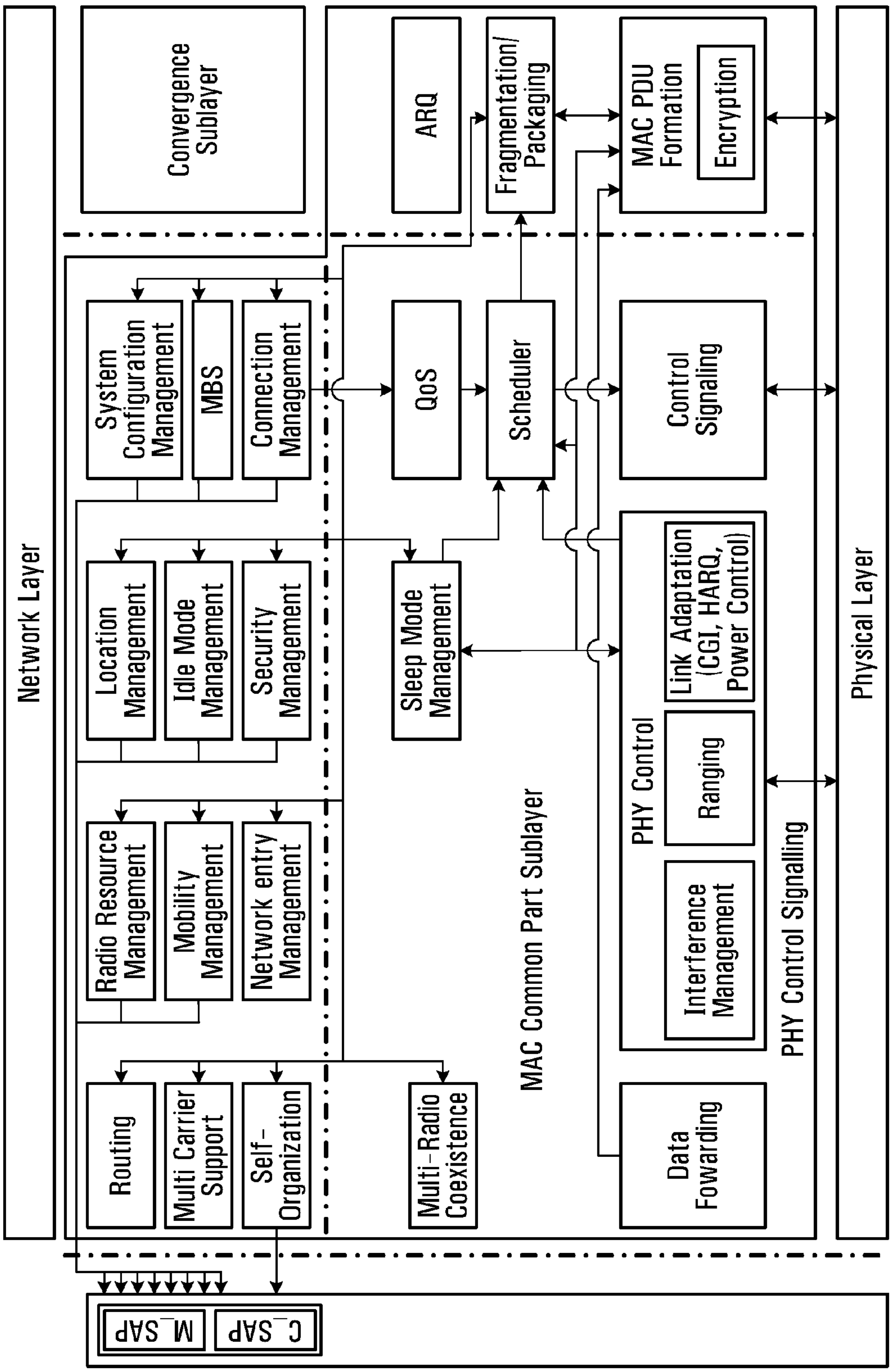
FIG. 12 is a Processing Flow diagram of the MS/BS Control Plane in accordance with IEEE 802.16m and corresponds to FIG. 6 of IEEE 802.16m-08/003rl.
Figure 13:
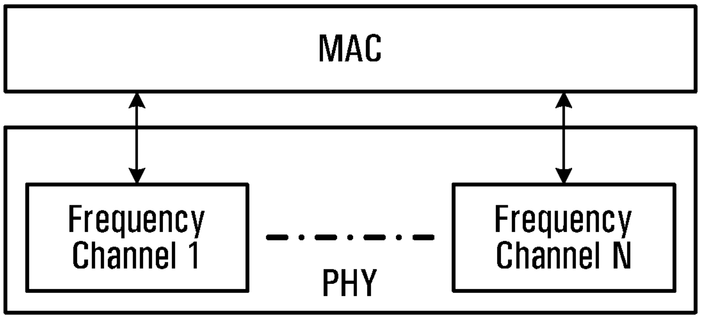
FIG. 13 is a schematic representation of a Generic protocol architecture to support a multicarrier system and corresponds to FIG. 7 of IEEE 802.16m-08/003rl.

Referring to FIG. 5, the control system 20, the baseband processor 22 and the transmit circuitry 24 are shown functionally in greater detail. The control system 20, among other things, implements a media access control function shown broadly in FIG. 10, for interfacing a network layer with a physical layer of the communication system. Accordingly, the control system 20 includes a network layer data input 200 and a user ID/Geometry input 202. These inputs may include registers (not shown) into which interface processors (not shown) may place data for use by the control system 20. Data received at the network layer data input 200 includes data such as video, audio etc. that may be passed between users, through the wireless system. Data received at the user ID/Geometry input 202 is received from the receive circuitry 26 and includes user identification data and geometry data associated with corresponding identified users that are registered with the wireless system.

Registering with the wireless system may occur in conventional manners such as by logging the entry of the user into one of the cells 12 served by one of the base stations 14, for example. Geometry data may include signal to noise ratio information provided by one of the mobile stations 16 itself, or may include positional information such as may be provided by location fixing functions such as GPS receivers in the mobile stations or through position extrapolation techniques carried out by the base stations 14. In any event the geometry data represents essentially the power used to transmit signals to one of the mobile stations.

The control system 20 includes a processor circuit 21 that executes the functions of the above-described medium access control aspect of the control system and in accordance with one embodiment of the invention executes certain additional functions to effect downlink optimization. In one embodiment these additional functions may be provided by augmenting the functionality provided to effect radio resource management and/or scheduling and resource multiplexing shown in FIG. 10.

In one embodiment, the processor circuit 21 is controlled by codes that may be stored on a computer readable medium and executable by the processor circuit. These codes may be represented by functional blocks as shown in FIG. 14.

Figure 14:
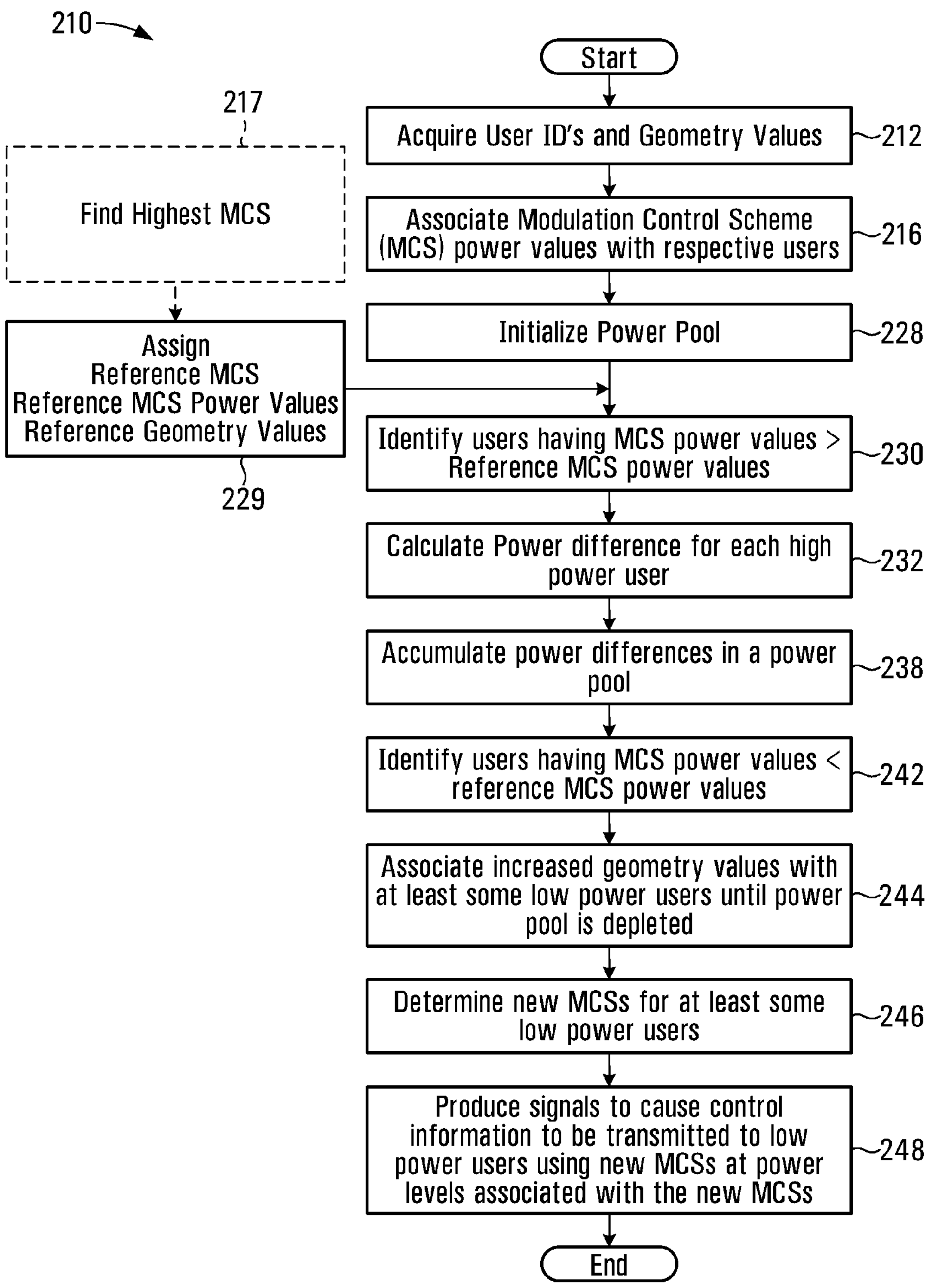
FIG. 14 is a flow chart of a process executed by a control processor of a base station for affecting downlink optimization between the base station and mobile stations in the communications system shown in FIG. 1 according to a first embodiment of the invention.

Referring to FIG. 14, in accordance with one embodiment of the invention, a process executed by the processor circuit 21 in one of the base stations 14 is shown generally at 210.

The process begins with block 212 that directs the processor circuit 21 to acquire user IDs and geometry values from the user ID/geometry input 202 shown in FIG. 5. Referring to FIG. 15, the user IDs and geometry values may be represented in a table, for example, as shown generally at 214 where, in essence, the user ID and corresponding geometry are provided as number pairs. Referring back to FIG. 14, block 216 directs the processor circuit to associate modulation control scheme (MCS) power values with respective users in response to respective geometry values.

To do this, referring to FIG. 16, the processor circuit 21 maintains a reference table 218 comprising a geometry range column 220, an MCS power value column 222 and an MCS column 224. The geometry range column 220 includes rows containing numbered pairs representing a range of geometry values that are to be associated with a corresponding MCS power value on the same row of the MCS power value column 222. Thus, for example geometry range 0 to 1.9 is associated with MCS power value 1. In addition, the MCS column 224 associates modulation and coding schemes with respective geometry ranges and MCS power values on the same row. Thus, for example the geometry range 0 to 1.9 and MCS power value 1 are associated with modulation and coding scheme QPSK 1/16. Thus, given a geometry from the table shown at 214, the range in which the geometry falls can be found in the geometry range column 220 to determine a row and from that row a corresponding MCS power value can be found from the MCS power value column 222 and corresponding modulation and coding scheme can be found from the MCS column 224.

Referring to FIG. 17, using the geometry values for each of the eight exemplary users depicted in FIG. 15, MCS power values are assigned as shown at 226 in FIG. 17.

Referring back to FIG. 14, block 228 directs the processor to initialize a power pool. The power pool may be implemented by simply causing the processor circuit 21 to establish a power pool buffer in memory. The power pool buffer is shown at 240 in FIG. 19.

Next, block 230 directs the processor circuit 21 to identify users having a MCS power value greater than a reference MCS power value. The reference MCS power value may be selected in a plurality of ways. For example, it may be re-programmed or supplied by other processor circuits or the same processor circuit 21 under control of a different algorithm. In the embodiments shown, the reference MCS power value is one of the MCS power values listed in the reference table 218 shown in FIG. 16. In this embodiment a pre-defined highest MCS power value suitable for downlink communications is selected and in this embodiment assume that MCS power value is 4, corresponding to a QPSK 1/4 modulation and coding scheme and corresponding to a geometry range of 5.2 to 6.4. In this embodiment an end point of the geometry range establishes a reference geometry value. For example, the reference geometry value may be 5.2, for an MCS power value of 4.

Referring back to FIG. 14 and further referring to FIG. 18, to facilitate easy identification of users having MCS power values greater than the reference MCS power value the number pairs representing user ID and geometry may be sorted in order of ascending or descending geometry. In the embodiments shown in FIG. 18, geometry values are sorted in descending order.

Referring to FIG. 14, block 232 causes the processor circuit 21 to calculate a power difference for each of the high power users, the power difference being a difference between the geometry value associated with a given high power user and the reference geometry value. This is seen best in FIG. 19 in which the sorted user ID, MCS power value and geometry tuples for the high power users are shown adjacent a partial column of reference geometry values and further adjacent is a column 236 of power difference values and an indication of the calculations used to find such power difference values.

Referring back to FIG. 14, block 238 directs the processor circuit 21 to accumulate the power differences in the power pool. Referring to FIG. 19, the contents of the power pool are stored in the power pool buffer shown generally at 240 and in this embodiment amount to a total of 11.9 geometry units. This means that 11.9 geometry units represent excess power being used by high power users served by the base station 14, which could be used by other users served by the same base station to improve their geometry if the high power users were directed to use the modulation and coding scheme and associated power associated with the reference geometry value and lower power users are directed to use modulation and coding schemes and associated powers that will provide better geometry values to improve control transmission reliability and power efficiency. Accordingly, referring back to FIG. 14 block 242 directs the processor circuit 21 to identify users having an MCS power value less than the reference MCS power value. Referring to FIGS. 18, 19 and 20 it can be seen that the 4 users in the bottom half of the tables shown are low power users. Referring to FIG. 14, block 244 directs the processor circuit 21 to associate increased geometry values with at least some of the low power users while depleting the power pool by corresponding amounts, until the power pool is depleted. This is best seen in FIG. 20 where the geometry values of the low power users are subtracted from the reference geometry values to obtain a subtraction amount for that user, the subtraction amount representing a portion of the power pool that can be allocated to that user to try to bring the geometry of that user up to the reference geometry value. Thus, for example, each of users 7, 3, 5, and 4 has a respective subtraction amount, the total of which adds up to 7.5, which is less than the 11.9 stored in the power pool buffer 240 shown in FIG. 19. Therefore it can be seen that if the high power users are caused to have a new target geometry corresponding to the reference geometry (5.2), the low power users can also be caused to have a target geometry corresponding to the reference geometry value and there may be power to spare. Accordingly, referring back to FIG. 14, block 246 directs the processor circuit 21 to determine new modulation coding schemes and associated power for the low power users based on increased geometry values i.e. target geometry values (5.2) now associated with the low power users. Thus, since the target geometry of 5.2 is associated with an MCS power value of 4, the MCS power value 4 is now associated with each of the users, as seen in FIG. 21. Knowing the MCS power value associated with each user, a corresponding target MCS can be determined from the reference table 218 shown in FIG. 16 and corresponding new modulation coding schemes are associated with corresponding users as shown in FIG. 22. Thus, output data representing user IDs and corresponding new modulation coding schemes and associated MCS power levels can be represented as shown in FIG. 23.

Figure 24:
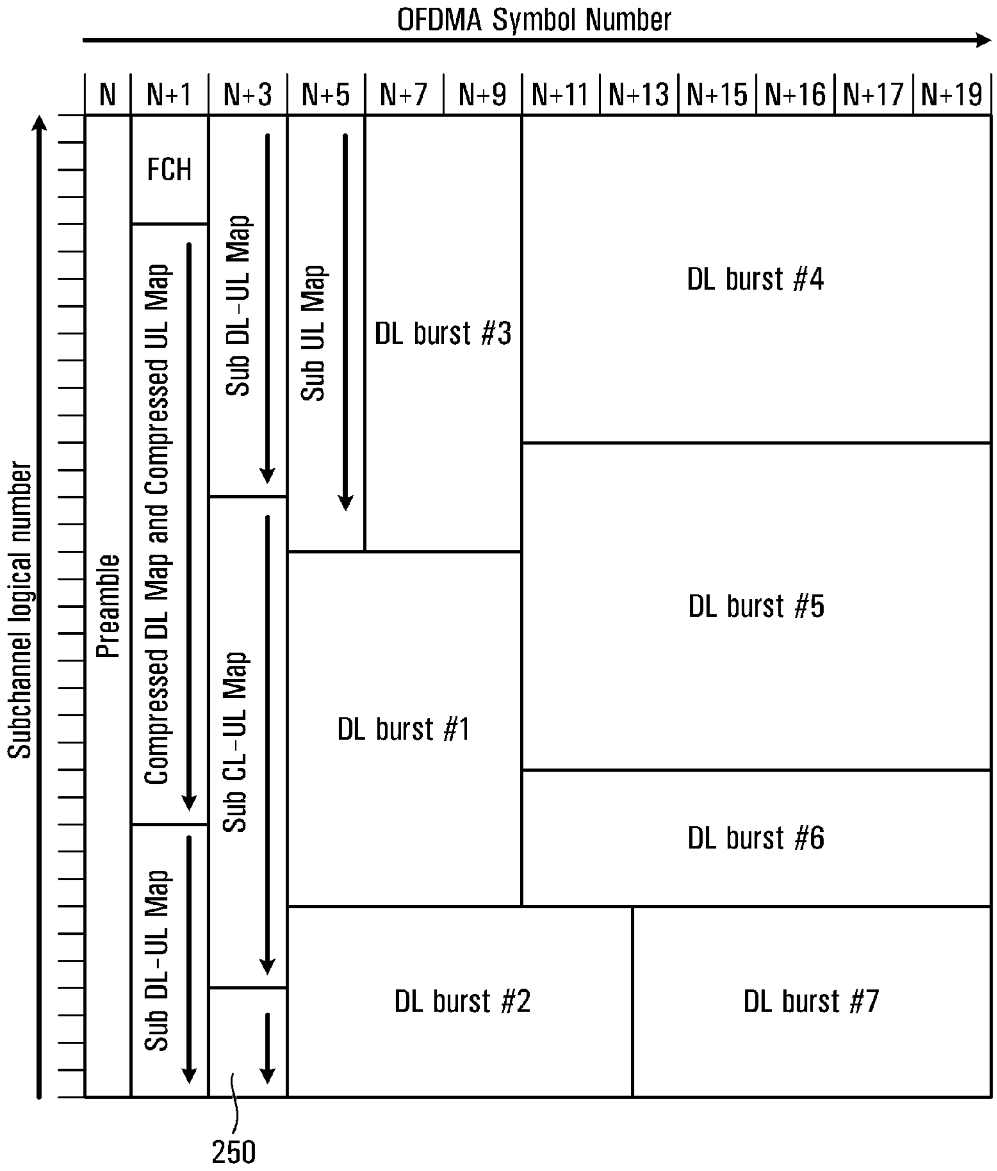
FIG. 24 is a schematic representation of an OFDMA frame containing the data shown in FIG. 23 to optimize power usage to the mobile stations.

Referring back to FIG. 14, block 248 directs the processor circuit to produce signals to cause control information to be transmitted to the low power users (and also the high power users) using modulation and control schemes identified by corresponding new modulation and control schemes at power levels associated with the new MCSs, shown in FIG. 22. These signals may be produced in the format of a conventional sub-map burst frame as shown in FIG. 24 in which at least one control patch such as shown at 250 in FIG. 24 includes information identifying users and corresponding modulation and control schemes to be used by the base station 14 for control communications with the mobile stations 16. Referring back to FIG. 5, this frame is provided to the transmit circuitry 24 as scheduled data 44.

In the embodiment described above, the reference geometry value, the reference MCS power value and a corresponding reference MCS were predefined. It is also possible however to set the reference geometry value, the reference MCS and the reference MCS power value according to the geometries of the users, as discussed below, in accordance with a second embodiment of the invention. For example, after sorting the user ID, geometry value and MCS power value tuples by geometry value, as shown in FIG. 18, the highest geometry value of 10 can be compared to the reference table 218 shown in FIG. 16 to determine that the MCS power value is 5, the corresponding MCS is QPSK 1/2, and the low end of the geometry range for this MCS power value is 6.5. Thus, after executing block 216 in FIG. 14, for example, where MCSs and MCS power values are associated with respective users, the processor circuit 21 may be directed to execute optional block 217 which directs the processor circuit to find the highest MCS by comparing the highest geometry value of the users with the geometry range values in the reference table shown in FIG. 16 to determine a geometry range. Then, once the geometry range is known, a corresponding MCS power value is known and a corresponding highest MCS is known from the reference table 218.

Then the processor circuit 21 is directed to block 229 which causes the processor circuit to assign as the reference MCS the highest MCS found at block 217 and to assign as the reference MCS power value, the corresponding MCS power value from the reference table 218 and to assign as the reference geometry value, the low end of the geometry range associated with that highest MCS power value. Then, processing continues as described above at block 230. Referring to FIG. 14 and FIG. 25, it can be seen that the reference geometry (6.5) is much higher than the earlier predefined reference geometry 5.2 of the first embodiment and therefore the additions to the power pool are much less, amounting to a total power pool value of 6.7, as shown at the power pool buffer 240.

Referring to FIGS. 14 and 26, when the processor circuit 21 is directed to block 244 to associate increased geometry values with at least some of the low power users until the power pool is depleted, the processor circuit starts with the user having the least geometry value (in this case 1.5) and calculates an amount (5.0) which must be taken from the power pool stored in the power pool buffer 240 shown in FIG. 25 to attempt to provide the corresponding user (user 4) with a target geometry equal to the reference geometry value of 6.5. After taking 5.0 geometry units from the power pool, 1.7 power units are left over and these may be assigned to the user with the next highest geometry value, in this case user 5. User 5 however only has a present geometry value of 2.8 and if the 1.7 from the power pool is added to this 2.8 the result is 4.5. This new geometry value of 4.5 is still an increase over the original geometry value of 2.8 and therefore a new target geometry value of 4.5 is associated with user 5. Thus, users 4 and 5 are given increased target geometry values.

Referring now to FIG. 27, the reference geometry values have been associated with the high power users and the two lowest low power users have had their target geometry values increased while the target geometries of users 7 and 3 remain the same at 4.7. Thus, various users have different target geometries but, at least two of the low power users have had their target geometries increased. Using these new target geometries and the reference table 218 shown in FIG. 16, block 246 of FIG. 14 is executed to compare the new target geometries with the geometry ranges of the reference table. It can be seen that the corresponding MCS power values are 5 for the high power users and for user 4 which was once the lowest of the low power users and an MCS power value of 3 is maintained for users 7 and 3 (i.e. no change) and an MCS power value of 3 is associated with user 5, which is an increase of 1 MCS power value over its original MCS power value. Thus, the new MCSs for these users remains the same for the high power users, is increased to the same as the high power users for the lowest of the low power users and is increased by one category for the second lowest of the low power users (i.e. user 5) and the MCS remains the same for users 7 and 3. Thus, at least some of the low power users have had their MCS increased.

Referring to FIG. 29, an output data table associating the new MCSs and new MCS power values with respective users is shown and is used to produce the signals that define the control patch 250 of the frame shown in FIG. 24 and transmitted from the control system 20 to the transmit circuitry 24 shown in FIG. 5 to cause the transmit circuitry to transmit the control patch using the new MCSs and power values associated with the new MCSs. The frame shown in FIG. 24 may be referred to as scheduled data 44.

Transmitting Scheduled Data to Mobile Station

Referring to FIGS. 1 and 5, the scheduled data 44, is a stream of bits and this stream is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using a channel encoder 50 to effectively add redundancy to the data to facilitate recovery and error correction at the mobile stations 16. The channel coding for a particular one of the mobile stations 16 is based on the CQI associated with the particular mobile station. In some implementations, the channel encoder 50 uses known Turbo encoding techniques. The encoded data is then processed by rate matching logic 52 to compensate for data expansion associated with encoding.

Bit interleaver logic 54 systematically reorders the bits in the encoded data to minimize loss of consecutive data bits. The re-ordered data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is chosen based on the CQI associated with the particular mobile station as discussed above in connection with FIGS. 14-29. The symbols may be systematically reordered using symbol interleaver logic 58 to further bolster the immunity of the transmitted signal to periodic data loss caused by frequency selective fading.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at the mobile stations 16. The STC encoder logic 60 will process the incoming symbols and provide "n" outputs corresponding to the number of the transmit antennas 28 for the base station 14. The control system 20 and/or the baseband processor 22 as described above with respect to FIG. 5 will provide a mapping control signal to control the STC encoder. At this point, assume the symbols for the "n" outputs are representative of the data to be transmitted and capable of being recovered by the mobile stations 16.

For the present example, assume the base station (14 in FIG. 1) has two of the transmit antennas 28 (n=2) and the STC encoder logic 60 provides two output streams of symbols. Each of the output streams of symbols is sent to a corresponding output path 61, 63, illustrated separately for ease of understanding. Those skilled in the art will recognize that one or more processors may be used to provide such digital signal processing, alone or in combination with other processing described herein. In each output path an IFFT processor 62 will operate on symbols provided to it to perform an inverse Fourier Transform. The output of the IFFT processor 62 provides symbols in the time domain. The time domain symbols also known as OFDM symbols are grouped into frames, by assigning a prefix by prefix insertion function 64. The resultant frame is up-converted in the digital domain to an intermediate frequency and converted to an analog signal via respective digital up-conversion (DUC) and digital-to-analog (D/A) conversion circuitry 66. The resultant (analog) signals from each output path are then simultaneously modulated at the desired RF frequency, amplified, and transmitted via RF circuitry 68 and the transmit antennas 28 to one of the mobile stations 16. Notably, pilot signals known by the intended one of the mobile stations 16 are scattered among the sub-carriers. The mobile stations 16, which are discussed in detail below, will use the pilot signals for channel estimation.

Reception of Signals at the Mobile Station

Figure 6:
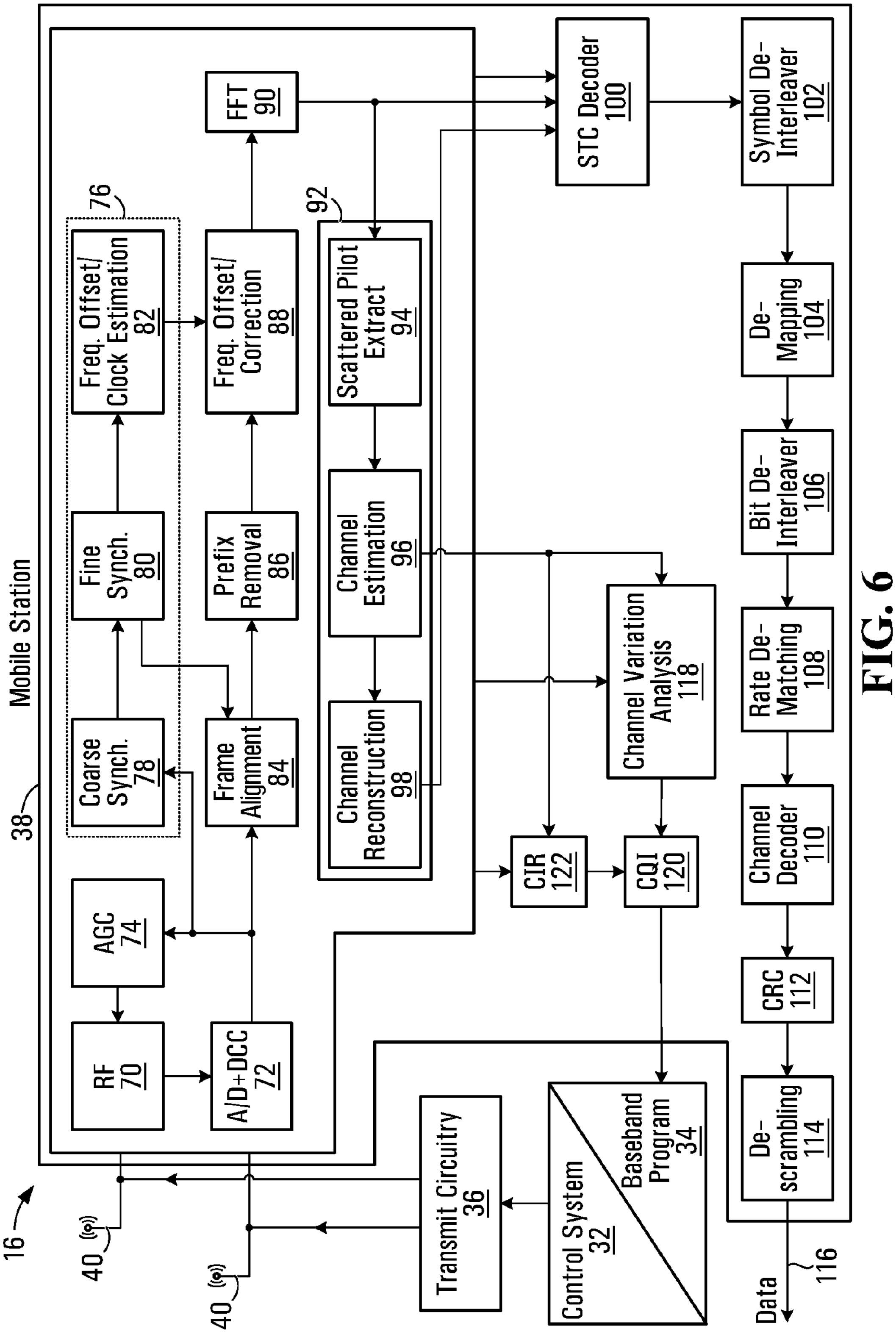
FIG. 6 is a block diagram of a logical breakdown of an example OFDM receiver of the wireless terminal shown in FIG. 3.
Figure 7:
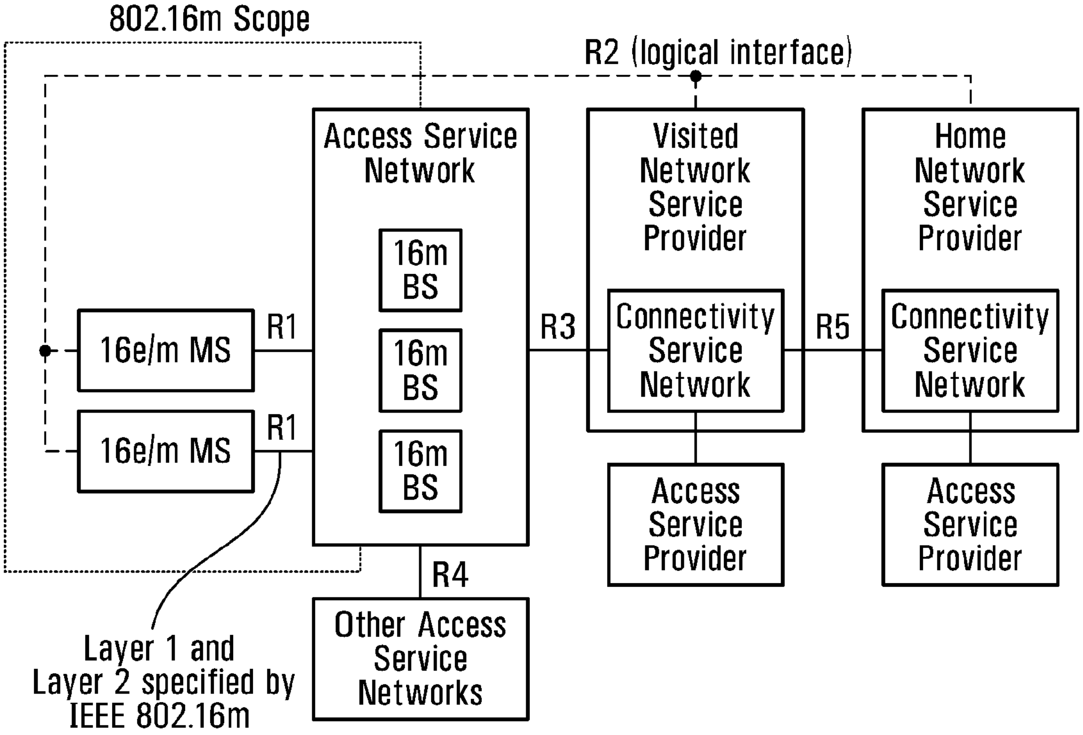
FIG. 7 is a schematic diagram of a network architecture implemented by the cellular communication system shown in FIG. 1 and corresponds to FIG. 1 of IEEE 802.16m-08/003r1.
Figure 8:
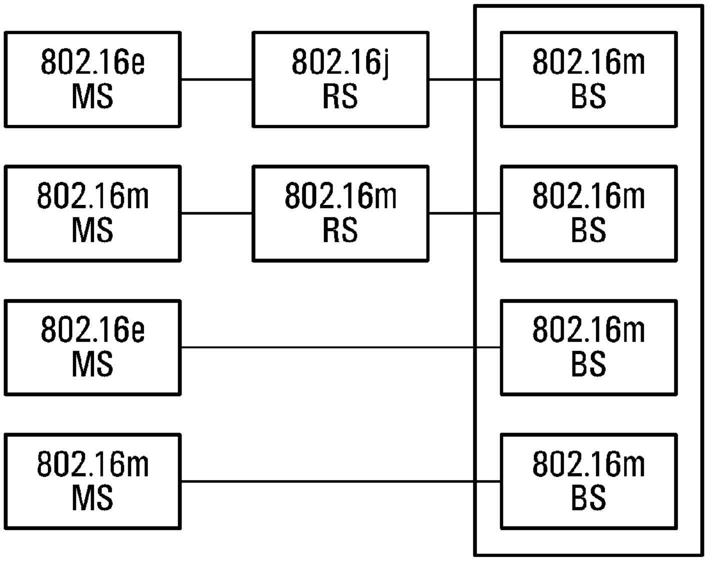
FIG. 8 is a schematic diagram of an architecture of the Relay Station shown in FIG. 4 and corresponds to FIG. 2 of IEEE 802.16m-08/003r1.
Figure 9:
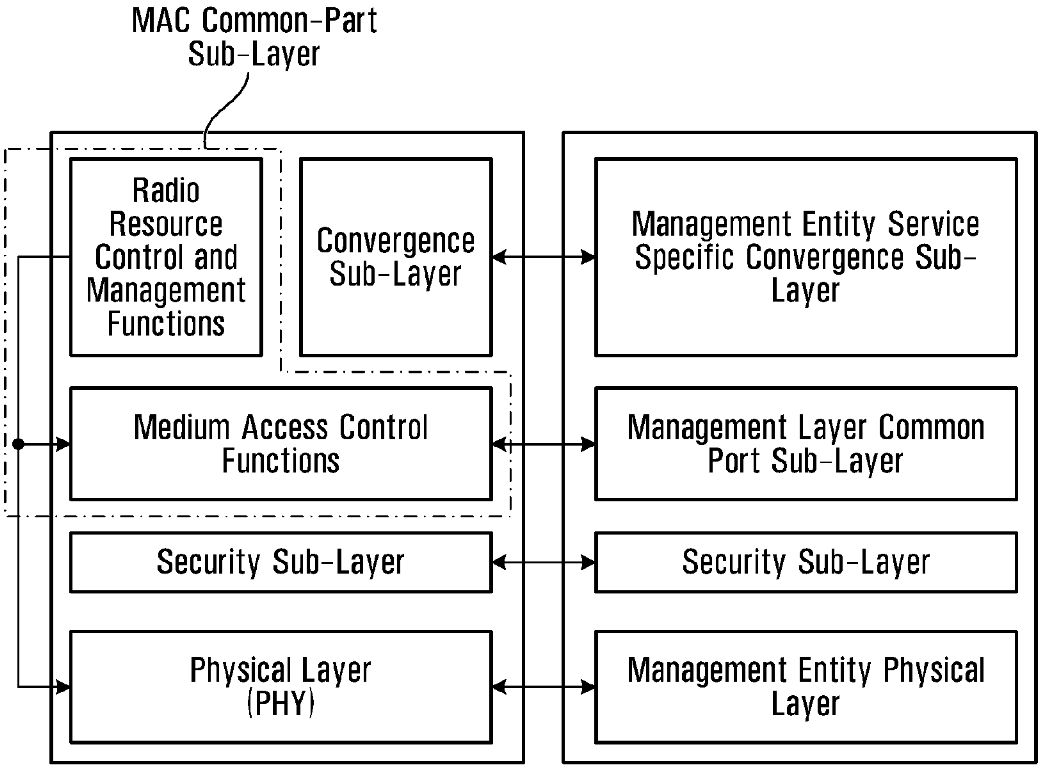
FIG. 9 is a schematic representation of a System Reference Model of the cellular communication system shown in FIG. 1 and corresponds to FIG. 3 of IEEE 802.16m-08/003r1.

Reference is now made to FIG. 6 to illustrate reception of the transmitted signals by one of the mobile stations 16, either directly from one of the base stations (14 in FIG. 1) or with the assistance of one of the relay stations (15 in FIG. 1). Upon arrival of the transmitted signals at each of the receive antennas 40 of one of the mobile stations 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of amplifiers in the RF circuitry 70 based on the received signal level.

Initially, the digitized signal is provided to synchronization logic shown generally at 76, which includes coarse synchronization function 78, which buffers several OFDM symbols and calculates an auto-correlation between the two successive OFDM symbols. A resultant time index corresponding to the maximum of the correlation result determines a fine synchronization search window, which is used by fine synchronization function 80 to determine a precise framing starting position based on the headers. The output of the fine synchronization function 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to a frequency offset/correction function 88, which compensates for the system frequency offset caused by the unmatched local oscillators in a transmitter and a receiver. Preferably, the synchronization logic 76 includes a frequency offset and clock estimation function 82, which uses the headers to help estimate frequency offset and clock offset in the transmitted signal and provide those estimates to the frequency offset/correction function 88 to properly process OFDM symbols.

At this point, the OFDM symbols in the time domain are ready for conversion to the frequency domain by an FFT processing function 90. The result is a set of frequency domain symbols, which are sent to a processing function 92. The processing function 92 extracts the scattered pilot signal using a scattered pilot extraction function 94, determines a channel estimate based on the extracted pilot signal using a channel estimation function 96, and provides channel responses for all sub-carriers using a channel reconstruction function 98. In order to determine a channel response for each of the sub-carriers, the pilot signal is essentially multiple pilot symbols that are scattered among the data symbols throughout the OFDM sub-carriers in a known pattern in both time and frequency.

Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to re-produce the originally transmitted data as data 116.

Still referring to FIG. 6, in parallel with recovering the data 116, a CQI, or at least information sufficient to create a CQI at each of the base stations 14, is determined and transmitted to each of the base stations. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, the relay stations may operate in a time division manner using only one radio, or alternatively include multiple radios.

While the above provides specific examples of a communication system in which embodiments of the invention are implemented, it is to be understood that embodiments of the invention can be implemented with communications systems having architectures that are different than the specific example provided above, but that operate in a manner consistent with the implementation of the embodiments described herein.

While specific embodiments of the invention have been described and illustrated, such embodiments should be considered illustrative of the invention only and not as limiting the invention as construed in accordance with the accompanying claims.

What is claimed is:

1. A method of optimizing downlink communications between a base station and mobile stations in a wireless communication system, the method comprising:

acquiring user identifiers and geometry values for said mobile stations that are associated with registered users of the system;

associating modulation control scheme (MCS) power values with respective said users in response to respective said geometry values;

initializing a power pool;

identifying, users that have an MCS power value greater than a reference MCS power value as high power users;

calculating a power difference for each of said high power users, said power difference being a difference between the geometry value associated with said each of said high power users and a reference geometry value associated with said reference MCS power value respectively;

accumulating in said power pool, said power differences associated with respective said high power users, by summing said power differences;

identifying users that have an MCS power value below said reference MCS power value as low power users;

associating increased geometry values with at least some of said low power users while depleting said power pool by corresponding amounts until said power pool is depleted;

determining new MCSs for said at least some of said low power users based on said increased geometry values; and causing control information to be transmitted to said low power users using modulation and control schemes identified by corresponding said new MCSs at power levels associated with said new MCSs.

2. The method of claim 1 wherein said geometry values include signal to noise ratio values.

3. The method of claim 2 wherein said signal to noise ratio is represented by signal to noise values received from mobile stations.

4. The method of claim 1 wherein associating MCS power values comprises assigning MCS power values according to ranges in which said geometry values reside.

5. The method of claim 1 further comprising sorting user identifiers in order of increasing or decreasing geometry values.

6. The method of claim 1 wherein associating said increased geometry values to at least some of said low power users comprises associating said reference geometry value to said low power users in order of increasing geometry.

7. The method of claim 1 wherein said reference MCS power value is a highest MCS power value required for downlink control.

8. The method of claim 1 wherein causing control information to be transmitted to said low power users comprises causing a control system of the base station to produce a frame comprising a control patch for transmission to said registered users according to said new MCSs at said power levels associated with said new MCSs.

9. The method of claim 1 further comprising assigning a reference MCS corresponding to said reference MCS power value to said high power users and causing communications with said high power users to be conducted using said reference MCS.

10. A computer readable medium encoded with codes for directing a processor circuit to execute the method of claim 1.

11. An apparatus for optimizing downlink communications between a base station and mobile stations in a wireless communication system, the apparatus comprising:

an input for receiving user identifiers and geometry values for said mobile stations that are associated with registered users of the system;

a processor circuit in communication with said input, said processor circuit being operably configured to:

associate modulation control scheme (MCS) power values with respective said users in response to respective said geometry values;

initialize a power pool;

identify users that have an MCS power value greater than a reference MCS power value as high power users;

calculate a power difference for each of said high power users, said power difference being a difference between the geometry value associated with said each of said high power users and a reference geometry value associated with said reference MCS power value respectively;

accumulate in said power pool, said power differences associated with respective said high power users, by summing said power differences;

identify users that have an MCS power value below said reference MCS power value as low power users;

associate increased geometry values with at least some of said low power users while depleting said power pool by corresponding amounts until said power pool is depleted;

determine new MCSs for said at least some of said low power users based on said increased geometry values; and an output in communication with said processor circuit for providing signals for causing control information to be transmitted to said low power users using modulation and control schemes identified by corresponding said new MCSs at power levels associated with said new MCSs.

12. The apparatus of claim 11 wherein said geometry values include signal to noise ratio values.

13. The apparatus of claim 12 wherein said signal to noise ratio is represented by signal to noise values received from mobile stations.

14. The apparatus of claim 11 wherein said processor circuit is operably configured to associate MCS power values to users according to ranges in which said geometry values reside.

15. The apparatus of claim 11 wherein said processor circuit is operably configured to sort user identifiers in order of increasing or decreasing geometry values.

16. The apparatus of claim 11 wherein associating said increased geometry values to at least some of said low power users comprises associating said reference geometry value to said low power users in order of increasing geometry.

17. The apparatus of claim 11 wherein said reference MCS power value is a highest MCS power value required for downlink control.

18. The apparatus of claim 11 wherein said processor circuit is operably configured to produce signals representing a frame comprising a control patch for transmission to said registered users according to said new MCSs at said power levels associated with said new MCSs.

19. The apparatus of claim 18 wherein said processor circuit is operably configured to assign a reference MCS corresponding to said reference MCS power value to said high power users and to cause the control patch to be transmitted to said high power users using said reference MCS and associated power level.

20. A base station in a wireless communication system comprising the apparatus of claim 11.

* * * * *